United States Patent [19]

Kronies et al.

[11] 3,919,692

[45] Nov. 11, 1975

[54] FAST INHIBIT GATE WITH APPLICATIONS

[75] Inventors: Reinhard K. Kronies, Glendora; John R. Coupland, El-Monte, both of Calif.

[73] Assignee: Burroughs Corporation, Detroit, Mich.

[22] Filed: Dec. 1, 1972

[21] Appl. No.: 311,275

Related U.S. Application Data

[62] Division of Ser. No. 124,415, March 15, 1971, Pat. No. 3,753,014.

[52] U.S. Cl. .................................... 340/172.5

[51] Int. Cl.² .................. G06F 13/00; H03K 19/00

[58] Field of Search .................. 340/172.5; 307/217

[56] References Cited

UNITED STATES PATENTS

| | | | |
|---|---|---|---|
| 3,543,246 | 11/1970 | Adams, Jr. | 340/172.5 |
| 3,638,198 | 1/1972 | Balogh, Jr. | 340/172.5 |
| 3,643,218 | 2/1972 | Cramwinckel | 340/172.5 |
| 3,753,014 | 8/1973 | Kronies et al. | 340/172.5 |

*Primary Examiner*—Gareth D. Shaw
*Assistant Examiner*—Michael C. Sachs
*Attorney, Agent, or Firm*—Christie, Parker & Hale

[57] ABSTRACT

An electronic circuit that has two input terminals and is responsive to three combinations of binary input signals is useful as a fast inhibit gate. The electronic circuit functions as an RS flip-flop for two of the combinations of binary input signals and as a combinational logic element for the third combination, which is the combination of a binary 1 on each input. Binary data to be transferred through the circuit is applied to one input terminal with the complement being applied to the other input terminal. An inhibit signal in the form of a binary 1 is applied to the same terminal to which the complement of the data is connected. In this way the inhibit signal may be applied directly to the electronic circuit rather than through additional logic elements with their attendant delay. The fast inhibit gate is useful as a building block in a priority resolver, and particularly for a priority resolver employed in a computer system wherein a plurality of requestors such as data processors and multiplexors may seek access to a common randomly accessible memory.

7 Claims, 10 Drawing Figures

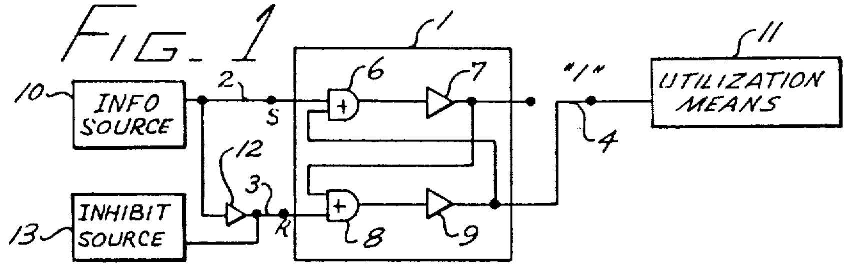
FIG. 1
FIG. 2
| INPUTS S | INPUTS R | OUTPUTS 1 | |
|---|---|---|---|
| 1 | 0 | 1 | |
| 1 | 1 | 0 | INHIBITED |
| 0 | 1 | 0 | INHIBITED |
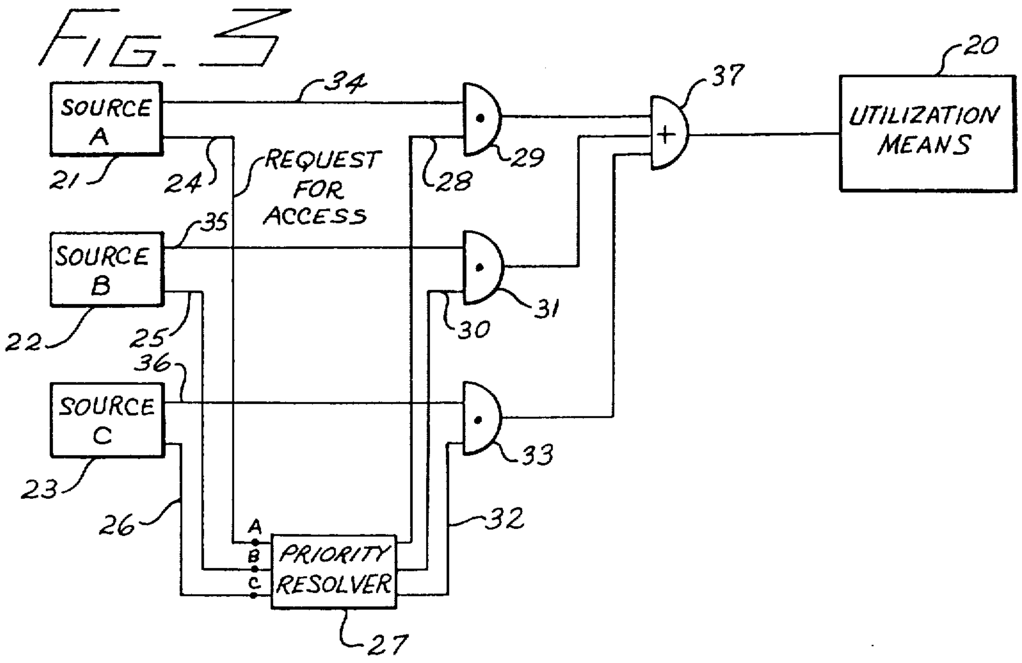
FIG. 3
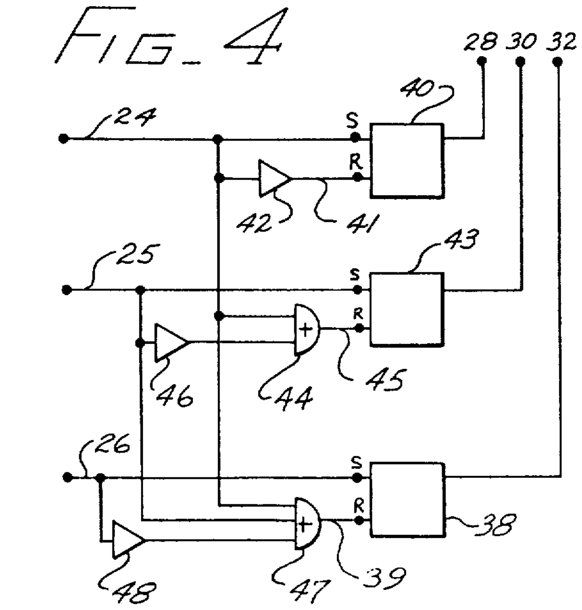
FIG. 4
FIG. 5
| SOURCE 21 | 22 | 23 | 24 | $\overline{41}$ | 25 | $\overline{45}$ | 26 | $\overline{39}$ | 28 | 30 | 32 |
|---|---|---|---|---|---|---|---|---|---|---|---|
| 1 | 0 | 0 | 1 | 0 | 0 | 1 | 0 | 1 | 1 | 0 | 0 |
| 1 | 1 | 0 | 1 | 0 | 1 | 1 | 0 | 1 | 1 | 0 | 0 |
| 1 | 1 | 1 | 1 | 0 | 1 | 1 | 1 | 1 | 1 | 0 | 0 |
| 1 | 0 | 1 | 1 | 0 | 0 | 1 | 1 | 1 | 1 | 0 | 0 |
| 0 | 1 | 0 | 0 | 1 | 1 | 0 | 0 | 1 | 0 | 1 | 0 |
| 0 | 1 | 1 | 0 | 1 | 1 | 0 | 1 | 1 | 0 | 1 | 0 |
| 0 | 0 | 1 | 0 | 1 | 0 | 1 | 1 | 0 | 0 | 0 | 1 |
| 0 | 0 | 0 | 0 | 1 | 0 | 1 | 0 | 1 | 0 | 0 | 0 |

FAST INHIBIT GATE WITH APPLICATIONS

CROSS REFERENCE TO RELATED APPLICATIONS

This application is a divisional application Ser. No. 124,415 filed Mar. 15, 1971, now U.S. Pat. No. 3,753,014.

BACKGROUND OF THE INVENTION

1. Field of the Invention

This invention relates to an electronic circuit that has two input terminals and is responsive to three combinations of binary input signals. A fourth combination of input signals does not cause the circuit to change state and the circuit therefore is not considered to be responsive to this fourth combination. Therefore, only the three combinations that cause a change in state will be considered hereinafter unless otherwise noted. The circuit is useful as a fast inhibit gate, which fast inhibit gate is useful in a priority resolution circuit, particularly where the priority resolution circuit is employed in a computer system having a plurality of requestors such as data processors and multiplexors that may simultaneously seek access to a common randomly accessible memory in the system.

A typical inhibit gate presently employed in computer systems employs an AND gate having two input terminals with the data to be transferred through the AND gate connected to one input terminal and a source of inhibit signals connected to the other input terminal through an inverter. Such an inhibit gate is relatively slow in operation because of the time delay for the passage of signals through the inverter and the AND gate. It has been found that a much faster inhibit gate results from the use of an electronic circuit that is designed to function as an RS flip-flop by applying the inhibit signal directly to the reset terminal of the circuit while employing the 1 or "on" output terminal of the inhibit gate as the output terminal of the circuit. The electronic circuit functions as a combinational logic element when the inhibit signal in the form of a binary 1 is present and the data to be transferred is in the form of a binary 1. The fast inhibit gate that results is useful in a computer system where speed of operation is of prime consideration.

2. Summary of the Invention

It has been found that electronic circuits designed for use as RS flip-flops with only two combinations of binary input signals, viz., 0,1 and 1,0, form very useful logic circuits when a third combination of input signals, viz., 1,1, are applied to the two inputs of the electronic circuit. This is disclosed in the copending application Ser. no. 123,959 filed concurrently herewith and now U.S. Pat. No. 3,742,253 issued June 26, 1973 assigned to the same assignee as this application. The electronic circuit of the referred to application is useful as a fast inhibit gate by proper sequencing and application of binary signals. Thus, the invention involves the method of employing as a fast inhibit gate an electronic circuit capable of functioniong as an RS flip-flop having a set input terminal, a reset input terminal, and a single output terminal. The method comprises the steps of applying a binary 1 to be transferred through the circuit to the set terminal, applying the complement of the binary 1 to the reset terminal, and selectively applying a binary 1 to the reset terminal to inhibit the transfer of the binary 1 on the set terminal to the output of the electronic circuit.

The invention further includes the use of a fast inhibit gate between a source of binary coded data and a utilization means where the gate comprises an electronic circuit having two input terminals and at least one output terminal and functions as an RS flip-flop for a first and a second combination of binary input signals and as a combinational logic element for a third combination of binary input signals. In the fast inhibit gate there is included a means for connecting the output of the source to one of the input terminals and the binary complement of the output of the source to the other input terminal. The gate further includes an input terminal to the same input terminal to which the complement is connected for a source of a binary inhibit signal in the form of a binary 1. Such a fast inhibit gate is useful in a priority resolver, and in particular in a priority resolver in a computer system. Thus, the invention also involves means for utilizing binary coded data, such as a randomly accessible memory, a plurality of requestors, such as data processors and multiplexors which may individually seek access to the memory, a controllable transmission gate between each requestor and the memory, and a priority resolver having an input from each requestor and an output for separately controlling each transmission gate associated with a particular requestor, and a request for access control line from each requestor connected to the respective input of the priority resolver. The priority resolver comprises a first path for the access request signal from the highest priority requestor to the transmission gate associated with the highest priority requestor, and a first electronic circuit having two input terminals and an output terminal, which circuit functions as an RS flip-flop for a first and a second combination of binary input signals and as a combinational logic element for a third combination of binary input signals. The electronic circuit is connected in the path of the access request signal of the lower priority requestor to the transmission gate associated with the lower priority requester. The priority resolver further includes circuit means for coupling the request for access signal from the highest priority requestor to one input terminal of the electronic circuit. The priority resolver may further include additional electronic circuits identical to the first electronic circuit connected between a requestor and its associated transmission gate in the path of the access request signal for each additional lower priority requestor with each electronic circuit having one input terminal coupled to the request for access signal of each higher priority requestor.

BRIEF DESCRIPTION OF THE DRAWINGS

These and other features and advantages of the present invention may be understood more fully and clearly upon consideration of the following specification and drawings in which:

FIG. 1 is a block diagram of a fast inhibit gate in accordance with the present invention;

FIG. 2 is a truth table of the fast inhibit gate of FIG. 1;

FIG. 3 is a block diagram of a system including a priority resolver in which the fast inhibit gate of the present invention is useful;

FIG. 4 is a block and schematic diagram of the priority resolver of FIG. 3;

FIG. 5 is a truth table of the priority resolver of FIG. 4;

DESCRIPTION OF THE PREFERRED EMBODIMENT

Figure 6:
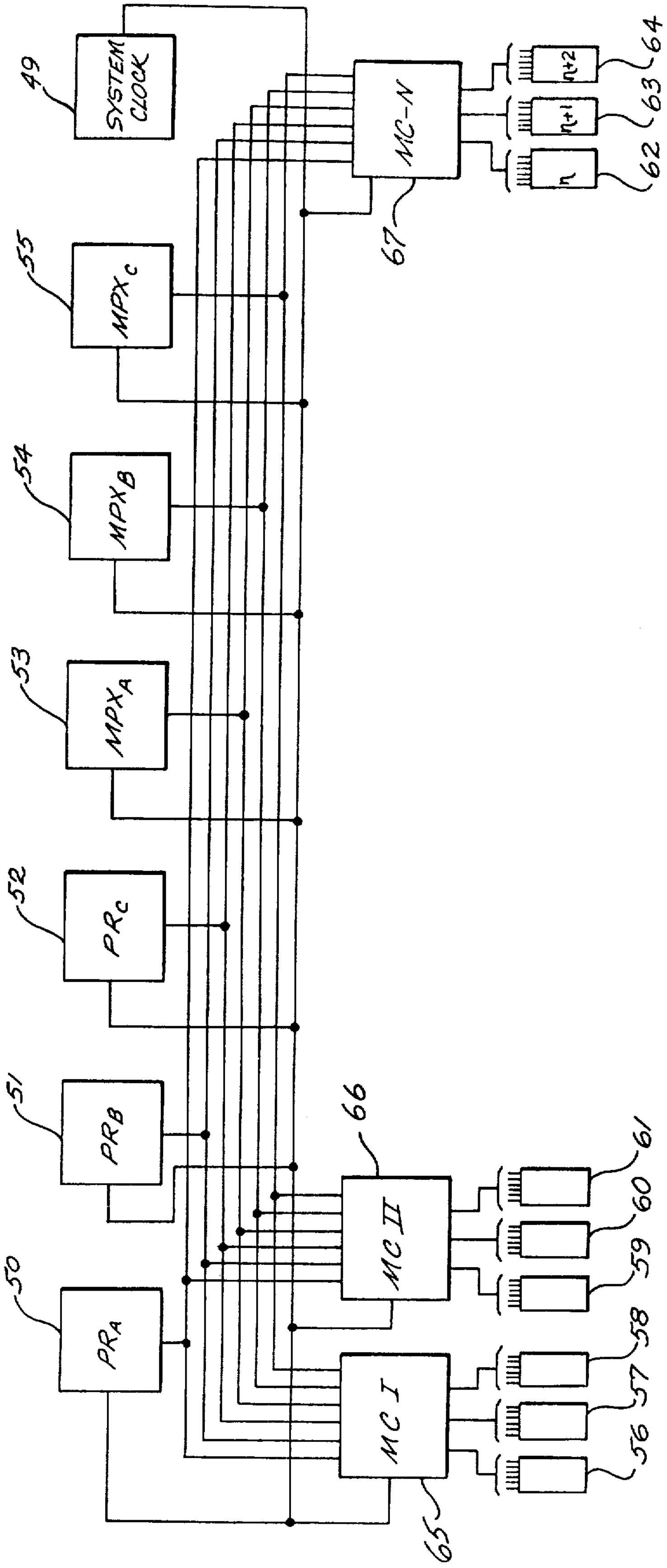
FIG. 6 is a diagram of a computer system in which the priority resolver of FIG. 4 is useful.

The electronic device 1, shown in schematic form in FIG. 1, has two input terminals 2 and 3 and one output terminal 4. The electronic device 1 may be a circuit designed for use as an RS flip-flop and which functions as a combinational logic element for one combination of input signals as disclosed in the above mentioned copending application Ser. No. 123,959. The terms RS flip-flop and "combinational logic element" as used herein are defined as follows.

For the purpose of this application as RS flip-flop is a flip-flop having two inputs designated R and S, with a flip-flop being an electronic circuit having two stable states and the ability to change from one state to the other on application of a signal in a specified manner. In an RS flip-flop the specified manner is the application of a binary 1 on the set input, which will set the flip-flop to the 1 or on state, or the application of a binary 1 on the reset input, which will reset the flip-flop to the 0 off state. As stated in the text "Reference Data for Radio Engineers", Fifth Edition, published by Howard W. Sams and Co., Inc. at page 20–5, in an RS flip-flop it is assumed that 1s will never appear simultaneously at both inputs. However, it has been found that for the case of binary 1s appearing at both inputs of the electronic device of FIG. 1, the device functions as the combinational logic element which is defined in the "Computer Dictionary" by Charles J. Sippl, edited by Howard W. Sams and Co., Inc., First Edition, on page 41, as a device having at least one output channel and one or more input channels, all characterized by discrete states, such that the state of each output channel is completely determined by the contemporaneous states of the input channels. Further for the purposes of this application, the terms "logic true" and "logic false" will be used interchangeably with the terms "binary 1" and "binary 0", respectively, unless specifically noted otherwise. However, this usage is not meant to detract from the broader definition of the terms "binary coded data" and binary 1s and binary 0s, which terms in themselves include logic trues and logic falses, which are binary.

The electronic device 1 when designed for use as an RS flip-flop may advantageously include an OR gate 6 and an inverter 7 connected between input terminal 2 and the output terminal that is not used, which is the 0 or off output terminal of the device. The electronic device 1 may further include a second OR gate 8 and a second inverter 9 connected in series between the input terminal 3 and the output terminal 4, which is the 1 or on output terminal of the device. The output of inverter 9 is coupled to OR gate 6 as one input thereto, and the output of inverter 7 is coupled to OR gate 8 as one input to this gate. Logic OR gates are represented in the drawings of this application by plus signs within the block for the element, and logic AND gates are represented by dots within the block for the element.

The electronic device of FIG. 1 is useful as a fast inhibit gate when connected as shown in FIG. 1. The method of employing the electronic device 1 as a fast inhibit gate comprises the steps of applying a binary 1 to input 2 for causing a binary 1 to appear on the output 4 and when it is desired to inhibit the transfer of the binary 1 on input 2 through the electronic device 1, a binary 1 is applied to input 3 which inhibits the transfer of the binary 1 on input 2 to the output 4. A truth table for the electronic device 1 is set forth in FIG. 2.

A source 10 of binary data to be transferred through the electronic device 1 to a means 11 for utilizing the binary data is coupled to the input terminal 2 of the electronic device 1. The complement of the output of source 10 is applied to input 3 through an inverter 12. The complement of the source is applied to one input so that the forbidden combination of input signals, i.e., 0, 0, immediately following the combination of 1, 1, is prohibited. A source 13 of inhibit signals is connected to input 3 of the electronic device 1. A binary 1 from source 13 on input 3, even with a binary 1 on input 2 will result in a binary 0 appearing on output 4, which will remain a binary 0 until the inhibit signal of a binary 1 from source 13 is removed from input 3.

An inhibit gate presently used in the computer field includes an AND gate with two inputs. One input is connected to the data to be transferred through the AND gate and the other input is connected through an inverter to a source of inhibit signals. Because of the use of the inverter, a substantial delay in the passage of the inhibit signal to the AND gate to inhibit the transfer of the data from the source is occasioned. The total delay may be as much as 40 nanoseconds or more. This large delay is avoided in accordance with this invention by applying the inhibit signal directly to one input of the electronic device 1, which results in a fast inhibit gate having a total delay of approximately 10 nanoseconds, so that it is approximately four times faster than the presently used inhibit gate. The fast inhibit gate of FIG. 1 is useful in a priority resolver in a system such as the one shown in block and schematic form in FIG. 3.

A utilization means 20 may be usable with a plurality of sources 21, 22, and 23. The utilization means 20 may be, for example, a random access memory and the sources 21, 22, and 23 may be requestors, such as data processors or multiplexors, with each source having the ability to access the memory of the utilization means 20. Source 21 has at least two output lines, one line 34 for data, such as memory address data, to be transferred to the utilization means 20, and another output line 24 for its request for access signal. Source 22 has a data output line 35 and a request for access signal output line 25, and source 23 has a data output line 36 and a request for access signal output line 26. Line 34 from source 21 is connected to one input of an AND gate 29, line 35 from source 22 is connected to one input of an AND gate 31, and line 36 from source 23 is connected to one input of an AND gate 33. Each of the AND gates 29, 31, and 33 operates as a controllable transmission gate and has a control input terminal. AND gate 29 has a control input terminal 28, AND gate 31 has a control input terminal 30, and AND gate 33 has a control input terminal 32. When each of the sources seeks access to the utilization means 20, there is an output of a request for access signal on output terminal 24 of source 21, output terminal 25 of source 22, and output terminal 26 of source 23. More than one of these request for access signals may exist at the same time. When they do, then the priority between the requestors seeking concurrent access must be resolved as to which one of the sources will be granted access to the utilization means 20. This priority is resolved in a priority resolver 27, which has an input from each one of the sources 21, 22, and 23. The priority resolver 27 has an output to control terminal 28 of AND gate 29, to control terminal 30 of AND gate 31 and to control terminal 32 of AND gate 33 where each AND gate is respectively associated with sources 21, 22, and 23. The output of the AND gates 29, 31, and 33 are respectively connected to separate input terminals of an OR gate 37. The output of the OR gate 37 is connected to the input of the utilization means 20. Data can be transferred through the AND gates 29, 31, and 33 only when a binary 1 is applied to the respective control terminals 23, 30, and 32. Such a binary 1 is applied by the priority resolver when one or more request for access signals is applied at the input to the priority resolver 27.

The priority resolver is shown in schematic and block form in FIG. 4 and includes an RS flip-flop 40 connected between output 24 of source 21 and control terminal 28 of AND gate 29 in the path of the request for access signal from source 21. The complement of the request for access signal from source 21 appears at input 41 of flip-flop 40 through an inverter 42 having its input connected to output line 24. The flip-flop 40 may be replaced by a simple isolation gate or, alternatively, the output line 24 of source 21 may be connected directly to control terminal 28 of AND gate 29. In any event, source 21 is given the highest priority and its request for access signal may be applied directly to AND gate 29 to enable this gate and to permit the transfer of data through this gate. The priority resolver further includes a fast inhibit gate associated with lower priority source 22, which gate includes an electronic device 43 connected between output 25 of source 22 and control terminal 30 of AND gate 31. The electronic device 43 is identical to electronic device 1 disclosed in FIG. 1. Associated with electronic device 43 is an OR gate 44 having two inputs and one output. The output of OR gate 44 is connected to input terminal 45 of electronic device 43. One input terminal of OR gate 44 is connected to output line 24 of source 21. The other input to OR gate 44 is connected through an inverter 46 to output terminal 25 of source 22 so that the complement of the request for access signal from source 22 will appear on input terminal 45 of electronic device 43. The priority resolver 27 may further include as necessary for additional requestors, such as source 23, a second electronic device 38 connected between output line 26 of source 23 and control terminal 32 of AND gate 33. Electronic device 38 is also identical to the electronic device 1 of FIG. 1. Input terminal 39 of electronic device 38 is connected to the output of an OR gate 47, which has three input terminals. The top input terminal of OR gate 47 is conected to output 24 of source 21, the middle input terminal of OR gate 47 is connected to output terminal 25 of source 22, and the lower input terminal of OR gate 47 is connected through an inverter 48 to output terminal 26 of source 23 so that the complement of the request for access signal from source 23 will appear on input terminal 39 of electronic device 38.

A truth table for the priority resolver of FIG. 4 is shown in FIG. 5. In the priority resolver 27 as shown in FIG. 4, source 21 has been given the highest priority for accessing the utilization means 20, source 22 the next highest priority, and source 23 the lowest priority. This is accomplished by employing the request for access signal from source 21 as an inhibit input to input terminal 45 of electronic device 43 and as an inhibit input to input terminal 39 of electronic device 38. The next highest priority is given to source 22 over source 23 by coupling the request for access signal of source 22 to input terminal 39 of electronic device 38 so that when a request for access signal appears at the output of source 22 as a binary 1, it will be applied to input 39 as an inhibit signal to inhibit the passage of any request for access signal from source 23 through the electronic device 38.

A priority resolver incorporating fast inhibit gates as shown in FIG. 4 is especially useful in a computer system having a plurality of randomly accessible memories and a plurality of requestors, such as data processors and multiplexors, which are located different distances for each memory and which are designed to communicate with each of the individual memories. Such a computer system having a systems clock or master clock 49 and a plurality of requestors and a plurality of memory modules is representatively shown in block form in FIG. 6. The requestors are six in number and are made up of processor 50, processor 51, and processor 52, respectively designated $PR_A$, $PR_B$, and $PR_C$, and multiplexors 53, 54, and 55, respectively designated $MPX_A$, $MPX_B$, and $MPX_C$ in FIG. 6. The computer system may be made up of fewer or more requestors and the combination of processors and/or multiplexors may also be different.

Figure 7:
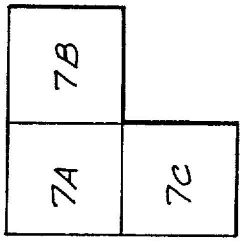
FIGS. 7A, 7B and 7C, positioned as shown in FIG. 7, form a block and schematic diagram of a portion of the computer system of FIG. 6 in detail.
Figure 7A:
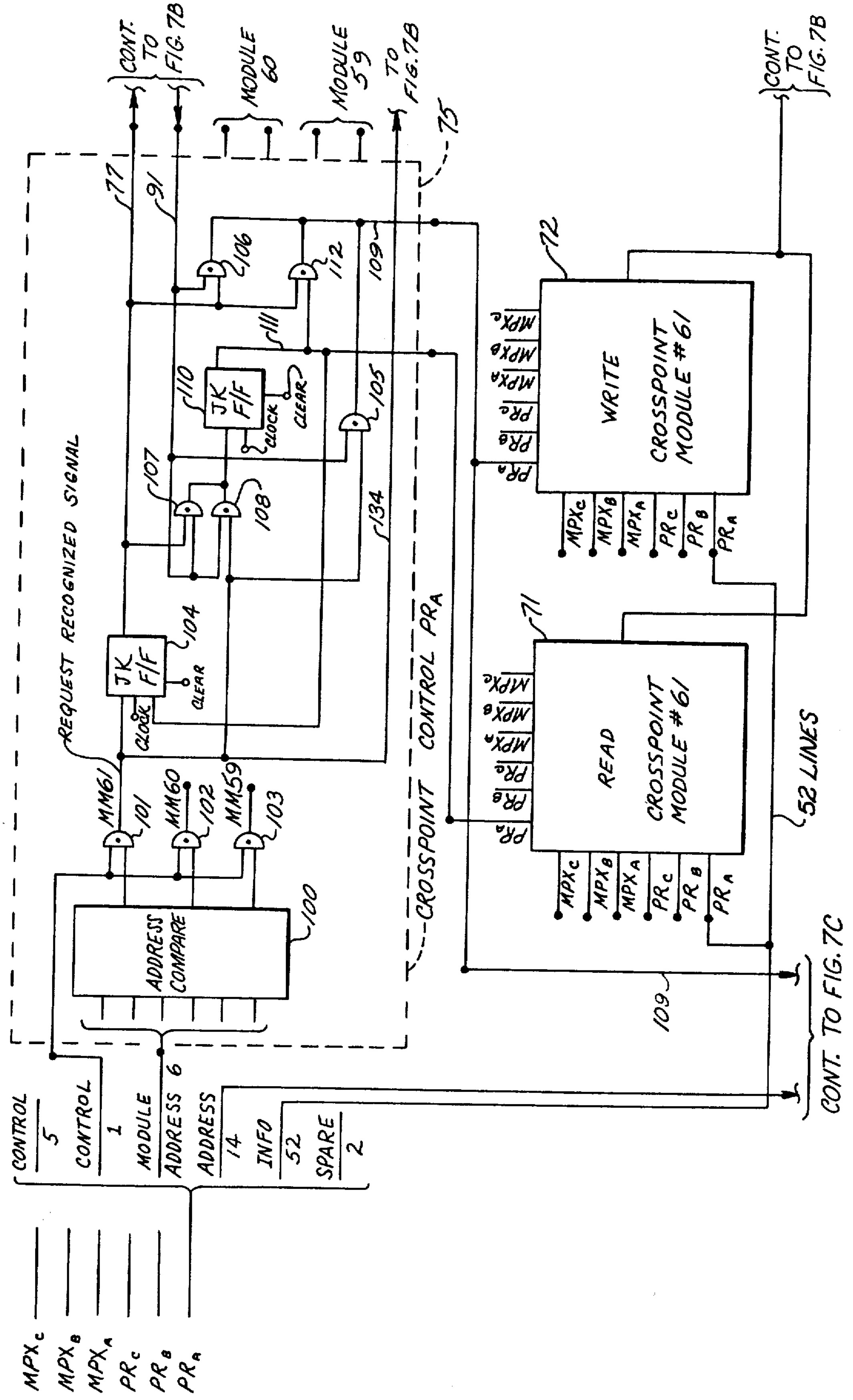

For purposes of illustration, it is assumed that each requestor may access any one of a number of memory modules representatively shown by modules 56 through 64 in FIG. 6. The access to each memory module is controlled by a memory control unit representatively shown in block form by memory control units 65, 66, and 67 in FIG. 6. Each memory control unit, such as memory control unit 66, controls access to three memory modules, such as modules 59, 60, and 61. The accessing of the memory modules and the resolution of priority may be better understood by reference to the more detailed diagram of FIGS. 7A, 7B, and 7C, positioned as shown in FIG. 7. It is assumed that acessing is being sought to module 61 by requestors 50 and 51, and that requestor 50 has been given the higher priority over requestor 51 so that concurrent attempts to access the same memory module will result in access being granted to requestor 50 over requestor 51. A portion of the memory control unit 66 is shown in block and schematic form in FIGS. 7A 7B and 7C and the memory modules 59 60, and 61 are shown in block form in FIG. 7B, with the control unit for memory module 61 being shown in some detail in FIG. 7B.

In one typical computer system, a typical computer cycle where a memory is accessed is 2000 nanoseconds. This represents 10 clock periods where a system clock having a 200 nanosecond repetition rate or 5 megacycle frequency is employed. Four of the 10 clock periods are employed in accessing a selected memory module and for completion of the memory cycle. However, it has been found that by employing the priority resolver of this invention, this time can be reduced in all cases to three clock periods, which represents a 10% increase in the possible speed of the computer system.

In the typical computer system, the cabling between the requestors 50 through 55 and the memory control units 65 through 67 will contain 80 lines, with the following assignments being made for these lines. Six lines carry the address for the module to which access is being sought. Fourteen lines carry the memory address, that is the location within the memory from where the information is to be read or in which the information is to be stored. Fifty-two lines carry the information. Six lines carry control signals, only one of which will be considered in detail as being necessary for an understanding of the invention, and two lines are spares.

The one control line that will be considered in detail is the line from each requestor that carries the signal which indicates that a requestor is requesting access to a memory module. Since each requestor may communicate with each memory module, the memory address lines are connected from each requestor to the memory through an address crosspoint unit representatively shown by the single address crosspoint unit 70 in FIG. 7C. Similarly, the information lines from each requestor are connected to each memory module through a read crosspoint unit and a write crosspoint unit, such as the read crosspoint unit 71 and write crosspoint unit 72, shown in block form in FIG. 7A, associated with memory module 61. Thus, in a memory control unit, such as memory control unit 66, there will be a read crosspoint unit, such as unit 71, for each memory module and a write crosspoint unit, such as unit 72, for each memory module controlled by the memory control unit. The read and write crosspoint units will have 52 lines from each requestor and 52 lines to its respective memory module.

In the address crosspoint unit 70, the control unit, including the priority resolver of the present invention, for only one address line of the 14 address lines is shown in schematic form. However, the control units for the other 13 lines which carry the other 13 bits of the memory address in the address crosspoint unit 70 will be identical. Thus, there will be 14 lines from each requestor to the address crosspoint unit for each memory module and 14 lines from each address crosspoint unit to the memory module as represented by the line 73 in FIG. 7C. The transmission of data through the crosspoint units 70, 71 and 72 is controlled by a crosspoint control unit 75 shown in block and schematic form in FIG. 7A for controlling an access request by requestor 50. There will be an identical crosspoint control unit in memory control unit 66 for each one of the other requestors 51 through 55.

Crosspoint control unit 75 includes a logic circuit 100 for comparing or decoding the module address from requestor 50 to determine if access is being sought by requestor 50 to one of the three memory modules 59, 60 and 61 controlled by memory control unit 66. The address compare circuit 100 has an output terminal for each of the controlled memory modules. Each output terminal is coupled to one terminal of a two input AND gate associated with a particular memory module. At the output of address compare circuit 100 is an AND gate 101 associated with module 61, an AND gate 102 associated with module 60, and an AND gate 103 associated with module 59. Each of the AND gates has its second input coupled to the control line from requestor 50 on which the access request signal is carried. One of the AND gates 101, 102, and 103 will have an output signal in the form of a request recognized signal of a binary 1 when its associated memory module is being accessed by requestor 50.

The single output of AND gate 101 is connected to the J or set input of a JK flip-flop 104. The output of AND gate 101 is also connected to one of the inputs of two input AND gates 105 and 108. The output of AND gate 101 is also coupled directly to the control unit 86 for memory module 61 by line 134.

The crosspoint control unit 75 further includes a control line 77 connected between the output of flip-flop 104, which functions as a queueing flip-flop, and the control unit 86 for memory module 61. A control line 91 couples access granted signals from the control unit 86 for memory module 61 back to crosspoint control unit 75.

The output of flip-flop 104 is connected to one input of an AND gate 107 and to one input of an AND gate 112 and of an AND gate 106. AND gates 105, 106, 107, and 108 have their second inputs coupled to control line 91. The output of AND gates 107 and 108 are connected directly to the J or set input of a JK flip-flop 110. The single output of flip-flop 110 is connected to the K or reset input of flip-flop 104 and one input of an AND gate 112. The second input of AND gate 112 is connected to the single output of flip-flop 104. The output of AND gates 105, 106, and 112 are connected to control line 109, on which a signal representing the combined request recognized signal and access granted signal is coupled to write crosspoint unit 72 and address crosspoint unit 70. The single output of flip-flop 110 is coupled directly to the read crosspoint unit 71.

Figure 7B:
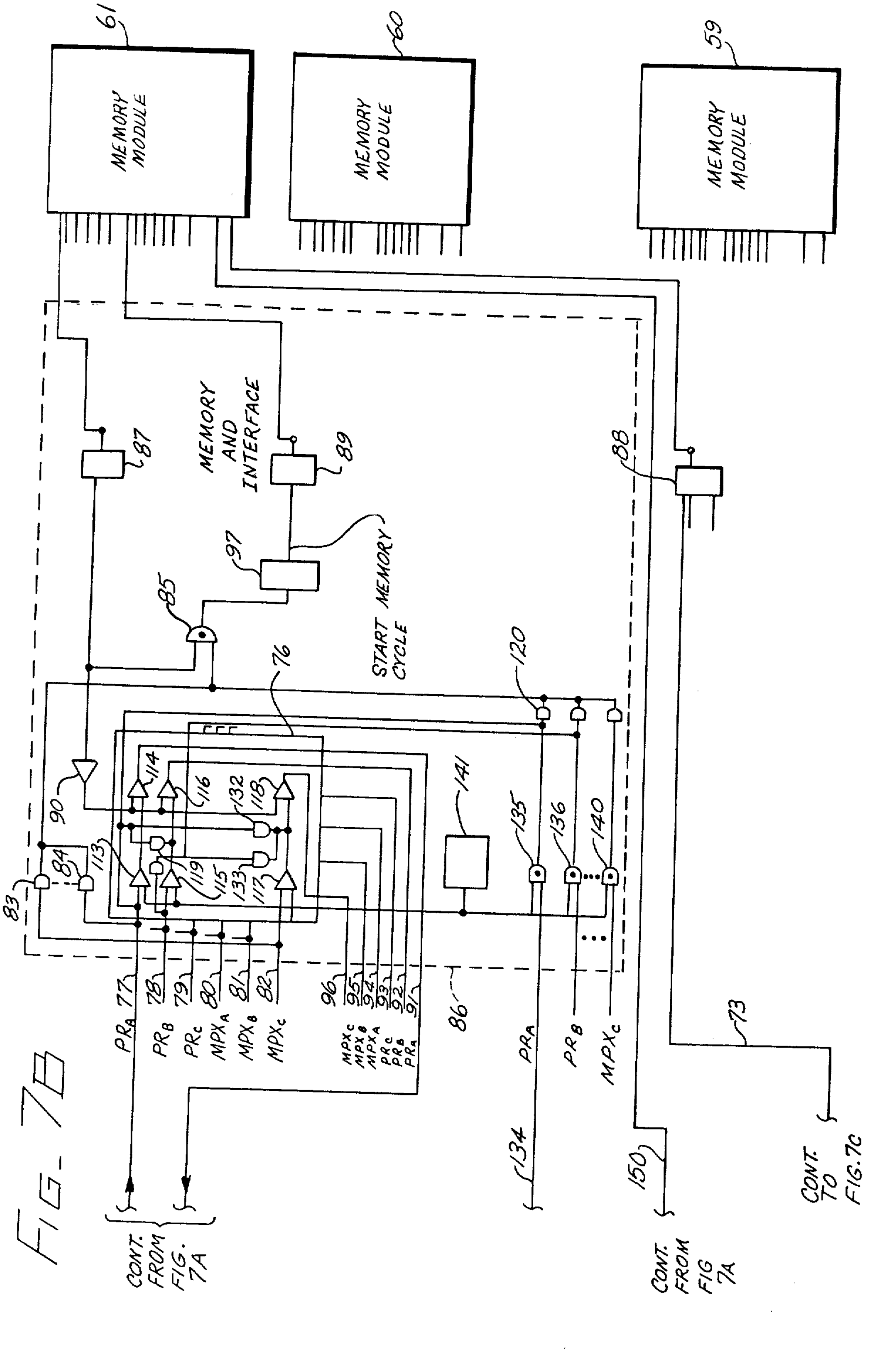
Figure 7C:
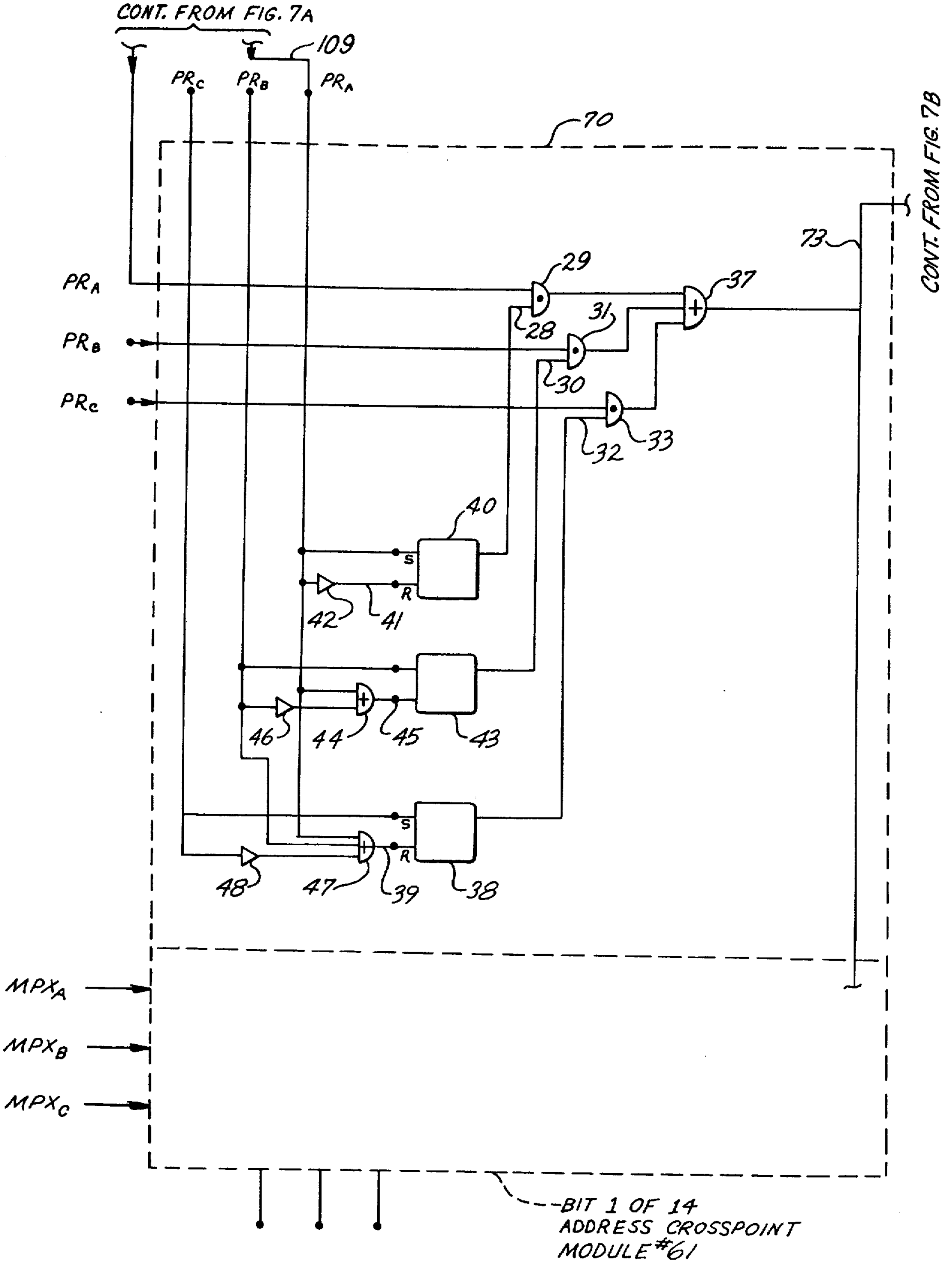

The memory modules 56 through 64 are all identical and are representatively shown in block form and the control unit in schematic form for memory module 61 in FIG. 7B control unit for memory. Module 61 includes a priority resolver 76 having a single input from each requestor on lines 77 through 82, with requestor 50 having its input on line 77. Additionally, the input from each requestor on lines 77 through 82 are coupled through isolation gates representatively shown by gates 83 and 84 to one input terminal of an AND gate 85. Included in the interface to the memory module 61 is a detector 87 that detects when the memory is idle and produces an output signal in the form of a binary 1 when the memory is idle. The interface further includes a register 88, shown in block form, and a memory cycle control unit 89, also shown in block form. Register 88 stores the memory address from the requestor to which access is granted that is transferred through the address crosspoint unit 70 and the other address crosspoint units in memory control unit 66.

The output of memory idle detector 87 is connected to the second input of AND gate 85 and also through an inverter 90 to the priority resolver 76. The output of inverter 90 operates to remove any access granted signals that may appear at the output of priority resolver 76 when the memory is in a memory cycle and not idle. When the memory is not idle, the output of detector 87 will be a binary 0 so that the output of inverter 90 will be a binary 1, which acts as an inhibiting signal to the priority resolver 76 in a manner to be explained.

In addition to the input lines to the control unit 86 for memory module 61 for the access request signals from each requestor, there is an output line associated with each requestor for transmission of the access granted signal from the priority resolver 76 in the control unit 86. These lines are lines 91 through 96, with line 91 carrying the access granted signal for requestor 50. For each requestor there is a pair of inverters in the priority resolver. For example, inverters 113 and 114 are connected in series between input line 77 and output line 91 associated with requestor 50. Similarly, inverters 115 and 116 are connected in series between input line 78 and output line 92 associated with requestor 51. Inverters 117 and 118 are connected in series between input line 82 and output line 96, associated with requestor 55. There are similar inverters connected between the input and output lines of the priority resolver 76 for the other requestors. Requestor 50 has the highest priority and does not have any inhibit connections from the other requestor lines. Requestor 51 has the second highest priority and only has an inhibit input from requestor 50, which comes from line 77 through an isolation gate 119 to the junction between inverters 115 and 116 associated with requestor 51. The lowest priority requestor, i.e., requestor 55, will have a similar inhibit signal input from all higher priority requestors as representatively shown by the inputs to the junction of inverters 117 and 118 through isolation gate 132 from line 77 of requestor 50 and isolation gate 133 from line 78 of requestor 51. The request recognized signal at the output of AND gate 101 is also coupled to control unit 86 for memory module 61 through line 134. This request recognized signal is applied to one input of AND gate 135. The request recognized signals from the other requestors are similarly applied to their respective AND gates 136 through 140 in control unit 86 for memory module 61. Each of these AND gates has a second input terminal from a permit access unit 141 shown in block form in FIG. 7B. Permit access unit 141 applies a binary 1 to the one input terminal of each of the AND gates 135, 136, and 137, and also a binary 1 to one input terminal of each of the inverters 113, 115, and 117. When the permit access unit 141 is wired to apply a binary 1 to its output, an access granted signal will appear on each of lines 91 through 96 if the memory is idle as indicated by a binary 1 at the output of detector 87 and a binary 0 at the output of inverter 90.

The output of AND gate 135 is coupled through an isolation gate 120 to one input of AND gate 85. This output is also connected as a priority resolution signal to the junction of inverters 115 and 116 associated with requestor 51 and to the junction of the inverters associated with each of the lower priority requestors in the priority resolver 76. Similarly, the output of the AND gates 136 through 140 will be coupled as priority resolution signals to the priority resolver to be applied to the junction of the inverters for lower priority requestors.

Although requestor 50 is shown as having the highest priority, any of the other requestors could be given the highest priority in the same manner requestor 50 is given the highest priority. In actual practice, multiplexors are generally given priority over processors so that requestors 53, 54, and 55 would probably have priority over requestors 50, 51, and 52.

A delay unit 97 is connected to the output of AND gate 85 to control the start of the memory cycle in response to the simultaneous occurrence of an access request recognized signal and a memory idle signal, both in the form of binary 1s. Additionally, when a request recognized signal is transmitted to the control unit 86 for memory module 61 from the crosspoint control unit for the respective requestors, a binary 1 will be applied to one input of AND gate 85 through the respective gate of AND gates 135 through 140 and will, after a predetermined delay as established by delay unit 97, start the memory cycle through memory control unit 89.

For purposes of illustration it is assumed that requestor 50 is requesting access to memory module 61, and that the proper module address appears in the form of a binary 1 at the input to address compare unit 100, so that a request signal appears at the output of address compare unit 100 and on one input terminal of AND gate 101 associated with memory module 61. The access request signal represented by a binary 1 from requestor 50 is applied to the other input terminal of AND gate 101 and also as an input to AND gates 102 and 103 associated with memory modules 60 and 59 respectively, which are controlled by memory control unit 66. However, AND gates 102 and 103 will not have an access request signal on their other inputs from address compare unit 100 since requestor 50 is requesting access to memory module 61 which has been identified by address compare unit 100. The output of AND gate 101 will be a request recognized signal, which is applied through AND gate 135 and isolation gate 120 to AND gate 85, assuming permit access unit 141 has a binary 1 output.

If the memory in memory module 61 is idle, there will be no inhibit signal at the output of inverter 90 and an access granted signal in the form of a binary 1 will appear on line 91 to return to crosspoint control unit 75. The access granted signal on line 91 will be appled to one input terminal of each of the AND gates 105, 106, 107, and 108 in crosspoint control unit 75. The second input to AND gate 105 is connected to the output of AND gate 101 for the application of the request recognized signal. Thus, when a request recognized signal and access granted signal are present at the input to AND gate 105, an output will appear on control line 109 to permit the transmission of data through the write crosspoint unit 72. Additionally, this signal will be applied to the address crosspoint unit 70 to control its operation in a manner to be described.

The second input to AND gate 108 comes from the output of AND gate 101 and is thus the request recognized signal. Thus, when the request recognized signal and access granted signal are present at the inputs to AND gate 108, the JK flip-flop 110, which is connected to the output of AND gates 107 and 108, will have an output on its output line 111. This output signal on line 111 is coupled to the read crosspoint unit 71 to control the transmission of information to requestor 50 through the read crosspoint unit 71.

Address crosspoint unit 70 for the first bit of memory address from each of the requestors includes the priority resolver and controllable transmission gates and output OR gate of FIGS. 3 and 4. Consequently the same reference numerals are employed in the address crosspoint unit 70 for the priority resolver and the controllable transmission gate and output OR gate. The sources 21, 22, and 23 of FIG. 3 are represented by the requestors 50, 51, and 52 of FIGS. 6 and 7 for the address crosspoint unit 70 and its priority resolver. The request for access signal for the priority resolution comes from the respective crosspoint control units in the memory control unit 66 as representatively shown by the crosspoint control unit 75 for requestor 50. With the permit access unit 141 wired to provide a binary 1 output, there will be a binary 1 input on at least one terminal of each of the inverters 113, 115, and 117. The binary 1 input will produce a binary 0 output, which will be applied to one input terminal of each of the inverters 114, 116, and 118. If the memory is idle so that a binary 0 appears at the output of inverter 90, then the other input to each of the inverters 114, 116, and 118 will also be a binary 0. With both inputs a binary 0, the output of each inverter 114, 116 and 118 will be a binary 1. Thus, there will be an access granted signal in the form of a binary 1 on each of the lines 91 through 96 associated with the requestors 50 through 55. The access granted signal associated with requestor 50 on line 91 will, in conjunction with a request recognized signal at the output of AND gate 101, produce an output at AND gate 105 on control line 109. The binary 1 which appears on line 109 will be applied to the access request line of the priority resolution circuit in address crosspoint unit 70.

Assuming that both requestors 50 and 51 seek access to memory module 61, then the crosspoint control unit associated with these requestors, such as crosspoint control unit 75, will apply a binary 1 to their respective input of address crosspoint unit 70. The two requestors 50 and 51 may have substantially different memory addressed to be cross routed through the address crosspoint unit 70. Thus, it is imperative that only one of the addresses be transmitted to the memory module 61. There will be priority resolution accomplished in priority resolver 76. However, this resolution will require time for the request recognized signal from the respective requestors to appear on the input lines to priority resolver 76 to function as inhibit signals within that resolver. However, even after the request recognized signals appear in priority resolver 76, there is a period of time before the access granted signal is removed as an input to AND gates 105 and 106. Because of this delay, priority resolution is also provided in address crosspoint unit 70. As noted above, the priority resolution circuit in address crosspoint unit 70 is the same as the resolver disclosed in FIGS. 3 and 4 and consequently it will operate in the same manner. Thus, if an access request signal from both requestors 50 and 51 appear at the inputs to RS flip-flop 40 and electronic device 43, there will only be one output because of the coupling of the access request signal from requestor 50 to input terminal 45 of electronic device 43. Thus, the fast inhibit gate including electronic device 43 will present a binary 0 on the control terminal 30 of AND gate 31 to prevent the passage of the address data from requestor 51. However, AND gate 29 will be enabled through flip-flop 40 and will pass the address data from requestor 50.

Because of the speed of operation of the fast inhibit gate in the resolver in the address crosspoint units, such as unit 70, resolution is accomplished with very little delay. In particular, priority is resolved within one clock period so that at the next clock from the system clock 49, the address and other information from the highest priority requestor seeking access may be reliably employed in the memory module.

What is claimed is:

1. In combination, a plurality of sources of binary coded data; means utilizing the binary coded data from the sources; a two input AND gate connected between each source and the utilization means; and a priority resolver, each source having an output connected to the priority resolver for transmitting a request for access to the utilization means through the priority resolver, the priority resolver having an output for each AND gate associated with each source for enabling the AND gate to transmit the data from a source to the utilization means with the priority resolver including means for coupling the request for access signal from the highest priority source directly to the AND gate associated with that source, said priority resolver including electronic circuits having two input terminals and at least one output terminal, which circuit functions as an RS flip-flop for a first and a second combination of binary input signals and as a combinational logic element for a third combination of binary input signals, connected in the path of each request for access signal for all lower priority sources with the request for access signal being applied to one input terminal and the complement of the request for access signal being applied to the other input terminal, and means for additionally coupling the request for access signal from each higher priority source to the one input terminal of the electronic circuit to which the complement of the request for access signal of the associated source is connected.

2. In a computer system, in combination, a randomly accessible memory; a plurality of requestors such as data processors and multiplexors which may individually seek access to the memory; a controllable transmission gate between each requestor and the memory, each gate having a control terminal; a priority resolver, said resolver having individual inputs from each requestor and individual outputs associated with each requestor for separately controlling each transmission gate associated with a particular requestor; and a request for access control line from each requestor connected to the respective individual inputs of the priority resolver, the priority resolver comprising a first path for the access request signal from the highest priority request to the control terminal of the transmission gate associated with the highest priority requestor, and electronic circuits having two input terminals and an output terminal, which circuit functions as an RS flip-flop for a first and a second combination of binary input signals and as a combinational logic element for a third combination of binary input signals, one of said electronic circuits being connected between an associated lower priority requestor and the control terminal of its associated transmission gate said circuit in the path of the access request signal of each of said lower priority requestors, with one input terminal being connected directly to the request for access control line of each requester and the other input terminal of the associated requestor being connected to the access control line through an inverter, and circuit means for additionally coupling the request for access signal from each higher priority requestor to the said other input terminal of each electronic circuit.

3. Method of granting priority of access to a randomly accessible memory to one requestor over another in a computer system having a plurality of memory modules; a plurality of requestors capable of communicating with one or more of the memory modules; and a memory control unit for one or more memory modules, with the memory control unit including address cross-routing circuitry in the path between the requestors and a particular memory module, comprising the steps of identifying the memory module requested in response to an access request by a requestor, determining whether the requested memory module is idle, generating a request recognized signal for each requestor seeking access to a memory module, resolving the priority of competing requestors to an identified module in the address cross-routing circuitry by applying each request recognized signal to a priority resolution circuit in the address cross-routing circuitry, and a response to the output of the priority resolution circuit enabling access to the identified memory from the highest priority requestor seeking access thereto provided the identified memory module is idle.

4. In a computer system having a plurality of requestor units made up of processors and/or multiplexors, a plurality of randomly accessible memories and a plurality of memory control units connected to control access to each memory in a specific group of memories; means in said memory control units for selectively coupling a requestor unit to a selected memory, said coupling means including control, circuit means for cross-routing the address data from said requestor unit to a selected memory; and circuit means for controlling the cross-routing means a cross-routing control circuit including a means for granting access to a particular memory module to a highest priority requestor and for generating an access granted signal for the said requestor granted access, the address cross-routing means including controllable gates for transmitting each bit of memory address data for each requestor unit, means for connecting the output of the controllable gates for the comparable individual bits of address data from each requestor, and a circuit means for enabling the controllable gates of the highest priority requestor to which access has been granted in response to the application of access granted signals from the cross-routing control circuit.

5. A data transmission system having in combination:

a plurality of sources of binary coded data;

means for utilizing the binary coded data from the sources;

a transmission gate with an enabling input terminal, at least one other input terminal and one output terminal, each gate being connected to an associated source at one of said other terminals and to the utilization means at said output terminal; and a priority resolver, each source having an output connected to the priority resolver for transmitting to the priority resolver a signal for requesting access to the utilization means, the priority resolver comprising means for coupling the request for access signal from the highest priority source directly to the enabling terminal of the transmission gate associated with that source, said priority resolver further comprising electronic circuits having two input terminals and at least one output terminal, which circuits function as an RS flip-flop for a first and a second combination of binary input signals and as a combinational logic element for a third combination of binary input signals, one of said electronic circuit being connected in the path of each request for access signal for all lower priority sources to the enabling terminal of the associated transmission gate with the request for access signal being applied to one input terminal of the electronic circuit and the complement of the request for access signal being applied to the other input terminal, and means for additionally coupling the request for access signal from each higher priority source to the one input terminal of the electronic circuit to which the complement of the request for access signal of the associated source is connected, the priority resolver having an output coupled to the enabling terminal of each transmission gate associated with each source for enabling the transmission gate to transmit the data from a source to the utilization means.

6. The combination in accordance with claim 5 wherein the first and second combination of binary input signals are a binary 1,0 and a binary 0,1, and the third combination of binary input signals is a binary 1,1.

7. The combination in accordance with claim 5 wherein the electronic circuit comprises:

a first OR gate having one input terminal connected as one input terminal of the electronic circuit and a second input terminal, a first inverter connected to the output of the first OR gate, a second OR gate having one input terminal connected as the other input terminal of the electronic circuit and a second input terminal, a second inverter connected to the output of the second OR gate, means for coupling the output of the first inverter to the second input terminal of the second OR gate, means for coupling the output of the second inverter to the second input terminal of the first OR gate, and means for coupling the output of one of the inverters to the output terminal.

* * * * *

UNITED STATES PATENT AND TRADEMARK OFFICE
CERTIFICATE OF CORRECTION

PATENT NO. : 3,919,692

DATED : November 11, 1975

INVENTOR(S) : Reinhard K. Kronies/John R. Coupland

It is certified that error appears in the above-identified patent and that said Letters Patent are hereby corrected as shown below:

Column 1, line 6, after "application" insert -- of Application --; line 40, the numeral 1 should be in quotes; line 41, "inhibit gate" should read -- circuit -- and "circuit" should read -- inhibit gate --;

Column 2, line 21, after "memory" insert -- ; --; line 24, after "memory" insert -- ; --; line 26, after "memory" insert -- ; --;

Column 3, lines 17 and 18, after "terms" should read -- "RS flip-flop" --; line 20, "as" should read -- an --; line 27, after "the" (first occurrence), should read -- "1" or "on" state, --; line 49, after "and" (first occurrence), should read -- "binary 1s" and "binary 0s", --; lines 55 and 56, after "the" (second occurrence), should read -- "0" or "off" --; lines 59 and 60, after "the" (second occurrence), should read -- "0" or "on" --;

Column 5, line 14, "23" should read -- 28 --;

Column 6, line 42, "acessing" should read -- accessing --;

Column 8, line 29, should read -- in FIG. 7B. Control unit for memory module 61 in- --;

Column 10, line 24, "appled" should read -- applied --;

Column 11, line 18, "dressed" should read -- dresses --;

IN THE CLAIMS:

Column 12, line 29, "quest" should read -- questor --; line 42, "quester" should read -- questor --;

Column 13, line 12, after "cross-routing means" insert -- ; --.

Signed and Sealed this

*eighteenth* Day of *May 1976*

[SEAL]

*Attest:*

RUTH C. MASON
*Attesting Officer*

C. MARSHALL DANN
*Commissioner of Patents and Trademarks*